Figure 1:
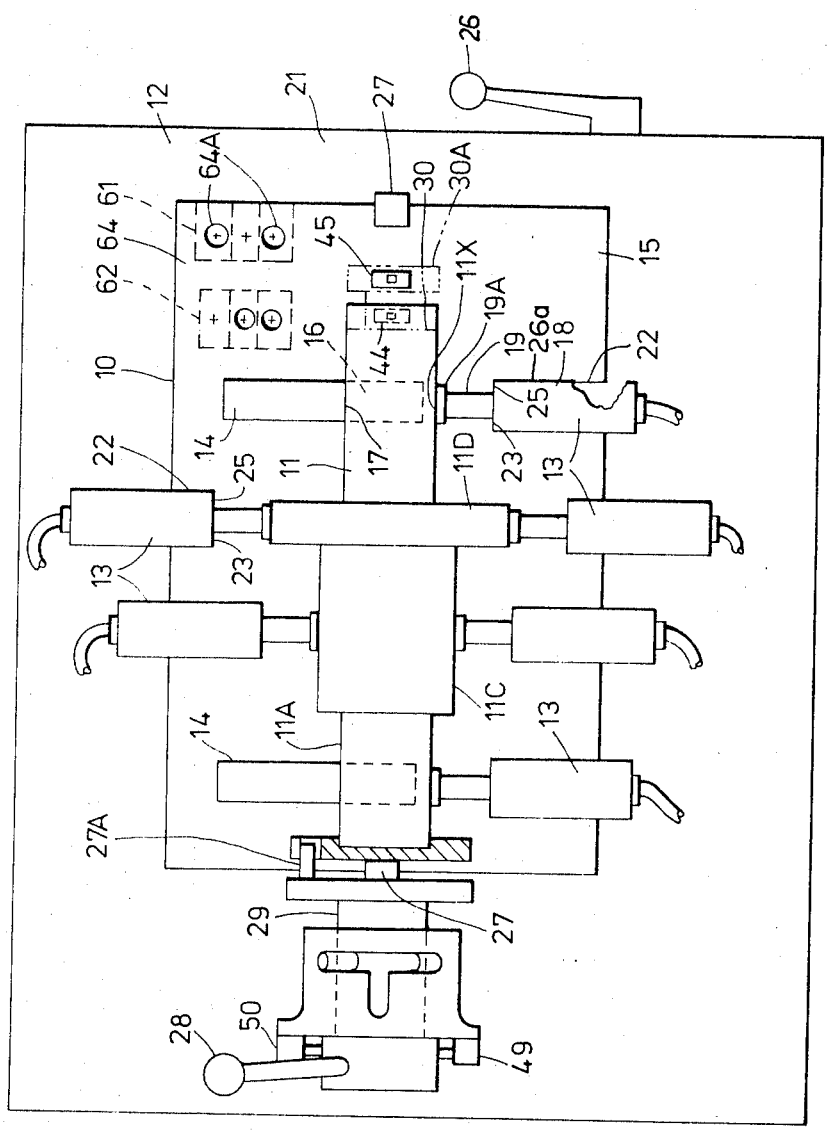

United States Patent
Bartlett et al.

[11] 3,869,800
[45] Mar. 11, 1975

[54] MEASURING APPARATUS AND SYSTEM

[75] Inventors: Christopher Leslie Bartlett; Peter Charles Willis, both of Bristol, England

[73] Assignee: Rolls-Royce (1971) Limited, London, England

[22] Filed: Dec. 27, 1972

[21] Appl. No.: 318,983

[30] Foreign Application Priority Data
Dec. 31, 1971   Great Britain.................... 60956/71

[52] U.S. Cl. ............ 33/174 L, 33/174 Q, 33/178 E
[51] Int. Cl. ........ G01b 7/02, G01b 7/12, B01b 7/31
[58] Field of Search...... 33/174 L, 174 PC, 174 PA, 33/174 Q, 178 E; 235/151.3, 151.32

[56] References Cited
UNITED STATES PATENTS

| | | | |
|---|---|---|---|
| 2,431,099 | 11/1947 | Wiseman et al................... | 33/174 L |
| 2,717,449 | 9/1955 | Graham............................ | 33/174 L |
| 3,557,462 | 1/1971 | Kiewicz et al..................... | 33/174 L |
| 3,633,011 | 1/1972 | Bederman ........................ | 33/174 L |
| 3,639,994 | 2/1972 | Palmenberg..................... | 33/174 PA |
| 3,670,420 | 6/1972 | Kiewicz et al..................... | 33/174 L |

FOREIGN PATENTS OR APPLICATIONS
753,788   8/1956   Great Britain.................... 33/174 Q
209,983   5/1940   Switzerland...................... 33/178 E

*Primary Examiner*—Richard E. Aegerter
*Assistant Examiner*—Richard Stearns
*Attorney, Agent, or Firm*—Stevens, Davis, Miller & Mosher

[57] ABSTRACT

Apparatus for measuring a plurality of dimensions of a component held in a fixture which has recesses to locate probes adapted to sense the dimensions. The recesses are arranged so as to make it possible for the probes to be identical as regards a distance obtained in the zero condition of the probe between a face thereof engaging a locating face of the recess and the working tip of a dimension-sensing movable element of the probe. The positioning of the probe in this way constitutes an at least rough calibration thereof. Further or fine calibration is effected by the use of a master of the component. The known dimensions of the master are stored in a computer and the actual dimensions of the component are computed by forming in respect of each dimension the algebraic sum of the master dimension, a probe reading taken when the master was in the fixture and a probe reading taken when the component was in the fixture.

1 Claim, 12 Drawing Figures

MEASURING APPARATUS AND SYSTEM

This invention relates to measuring apparatus for measuring articles of the sort generally referred to as "components," e.g., engineering components.

It is known to measure components by holding the individual component in a fixture and observing the response of a probe or gauge supported in relation to the fixture so as to be in contact with the component. When it is required to measure a variety of different components each occurring in relative small batches it is not economical to provide a fixture and probe assembly in relation to each of the components and to store such assemblies for uses which may be infrequent. It has therefore been the practice to remove the gauges from the assembly for re-use in connection with different fixtures. However, this practice has the disadvantage of being time-consuming because the probes have to be manually calibrated every time they are assembled in relation to the fixture, i.e., they have to be so adjusted that like probe readings are obtained for like component dimensions every time the probes are assembled for the measurement of a new batch of the components. It will be appreciated that this problem is particularly acute in assemblies having a large number of probes which, on account of the shape of the component, have to be arranged in close proximity.

According to this invention there is provided apparatus for measuring components, comprising a fixture for supporting the component and a plurality of identical probes, characterized in that the fixture is arranged to support the component in such manner as to enable one probe for each dimension to be mounted on the fixture so as to measure that dimension of the component.

Also according to this invention there is provided apparatus for measuring a plurality of dimensions of each of a plurality of components, comprising a base capable of receiving any one of a plurality of fixtures, one for each component, and a plurality of identical probes, characterized in that each fixture is arranged to support its respective component in such manner as to enable one probe for each dimension to be mounted at the respective fixture so as to measure that dimension of the component.

Figure 2:
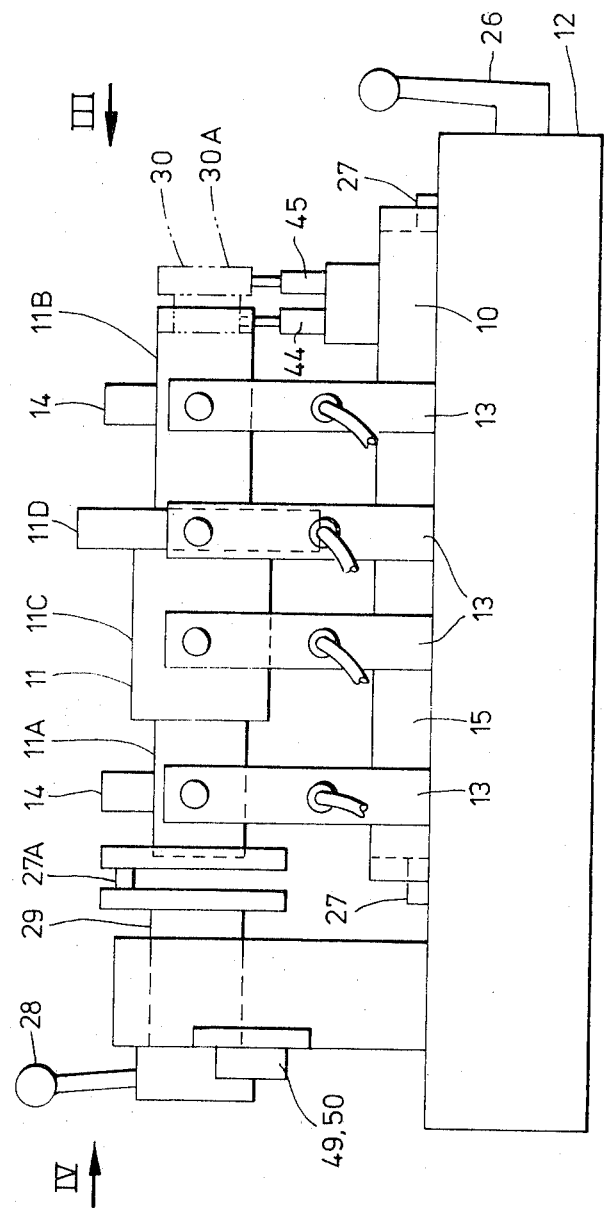
Figure 4:
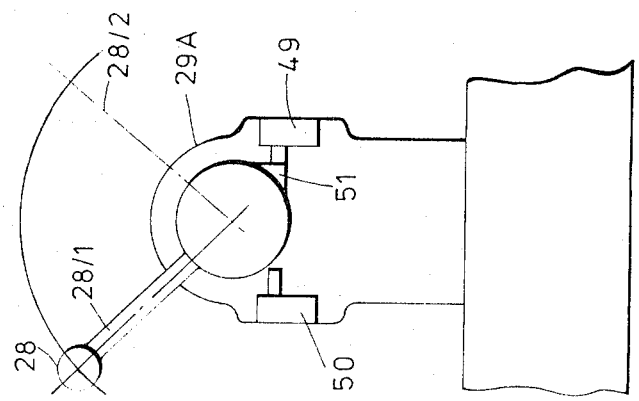
Figure 3:
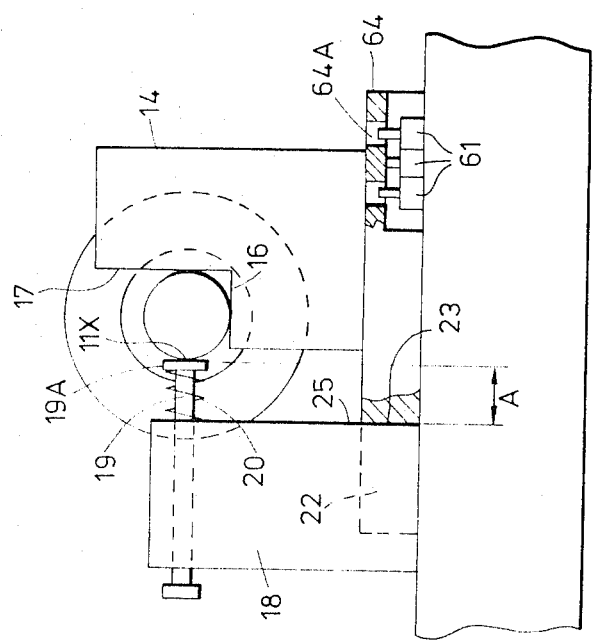
Figure 5:
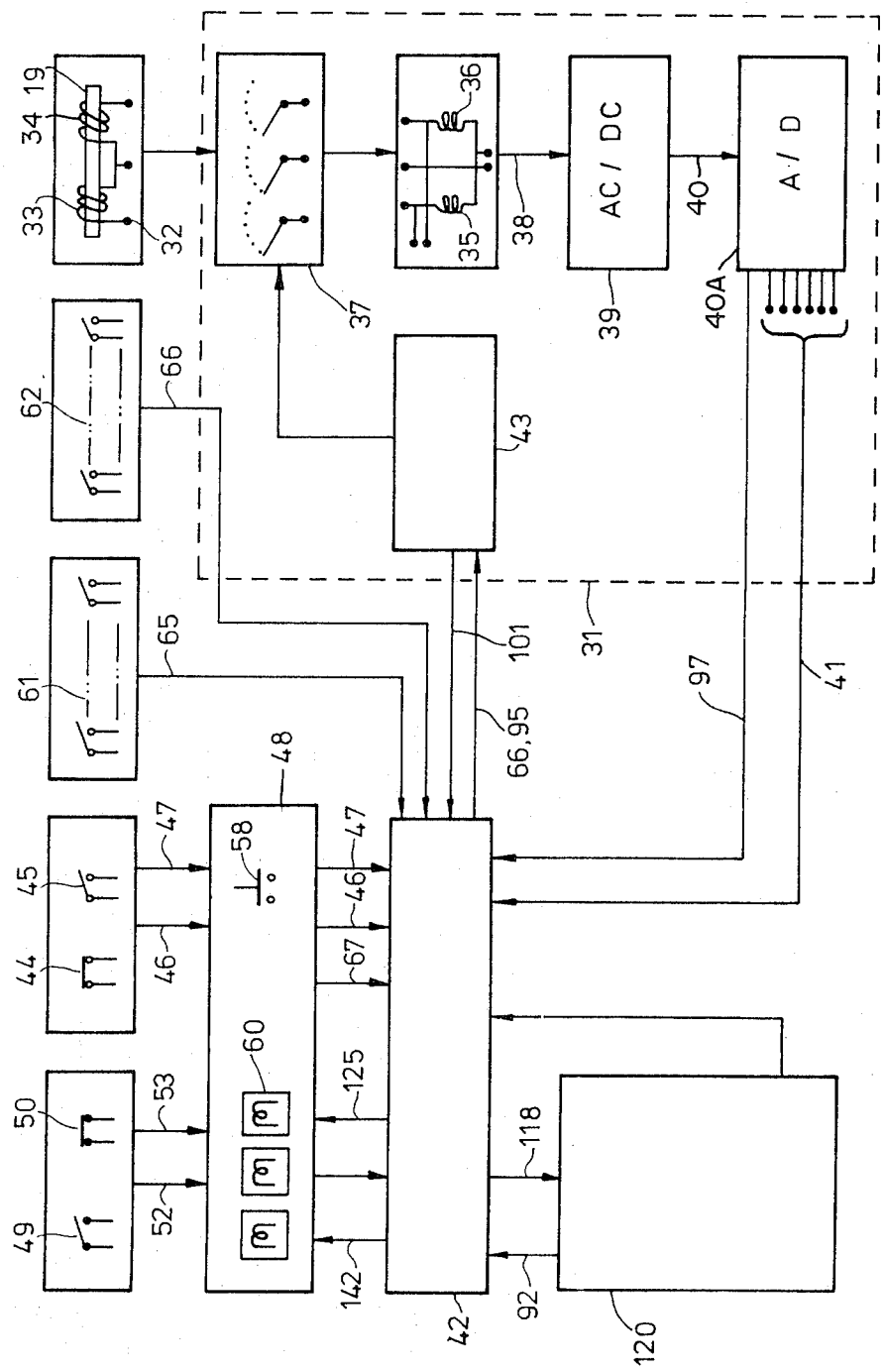
Figure 10:
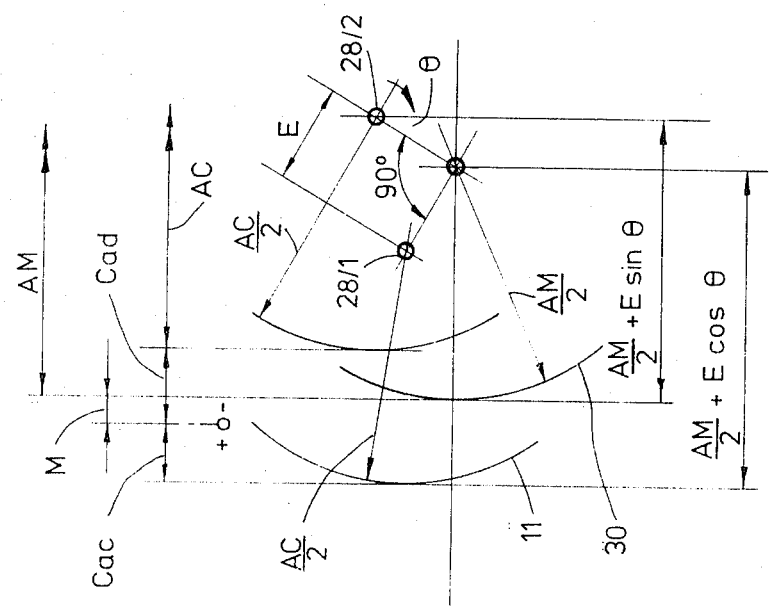
Figure 6:
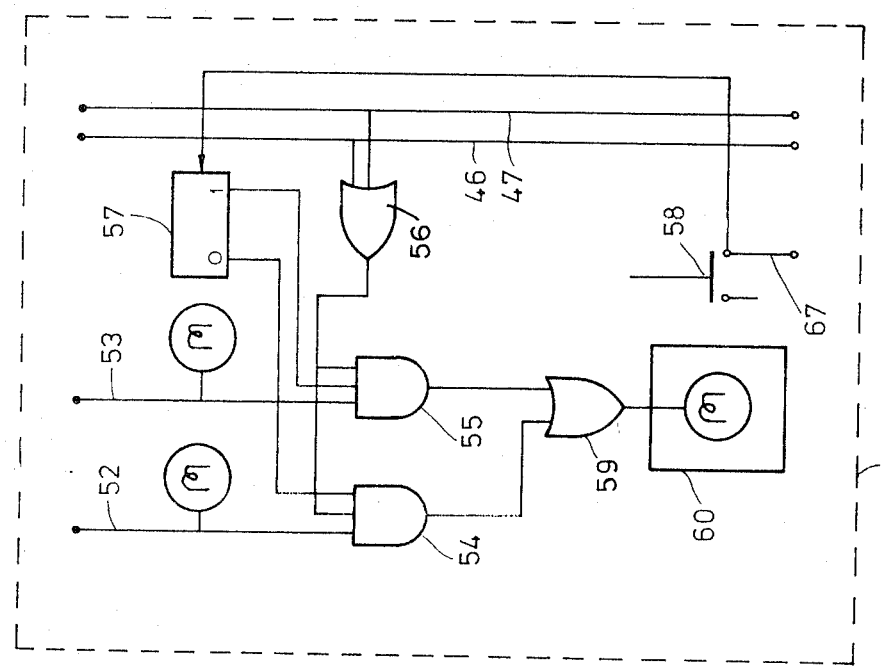
Figure 7:
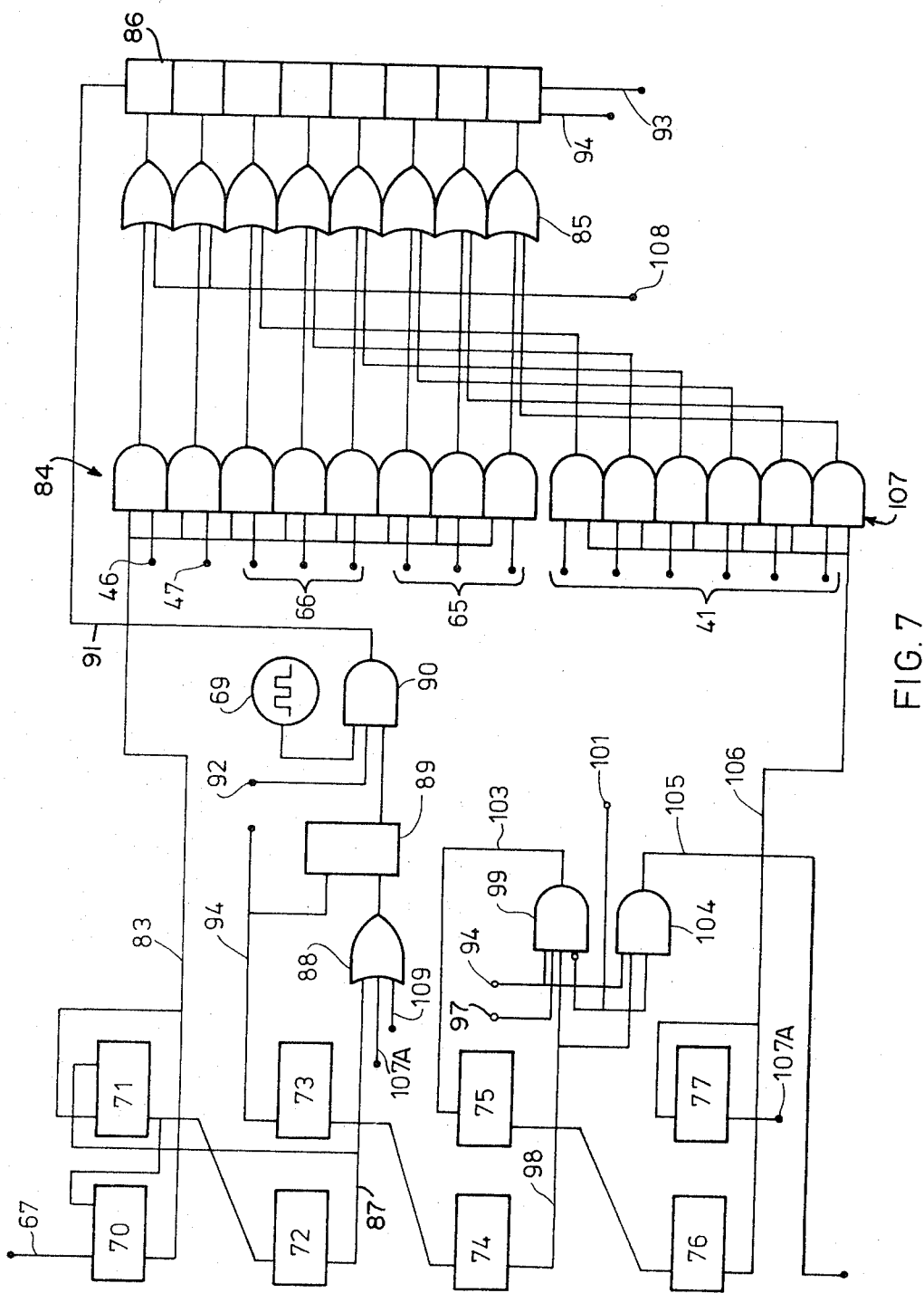
Figure 7A:
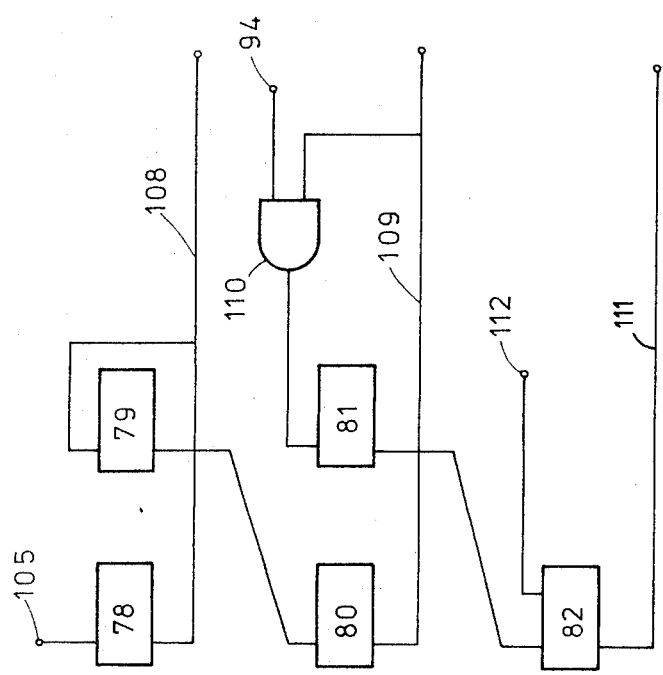
Figure 8:
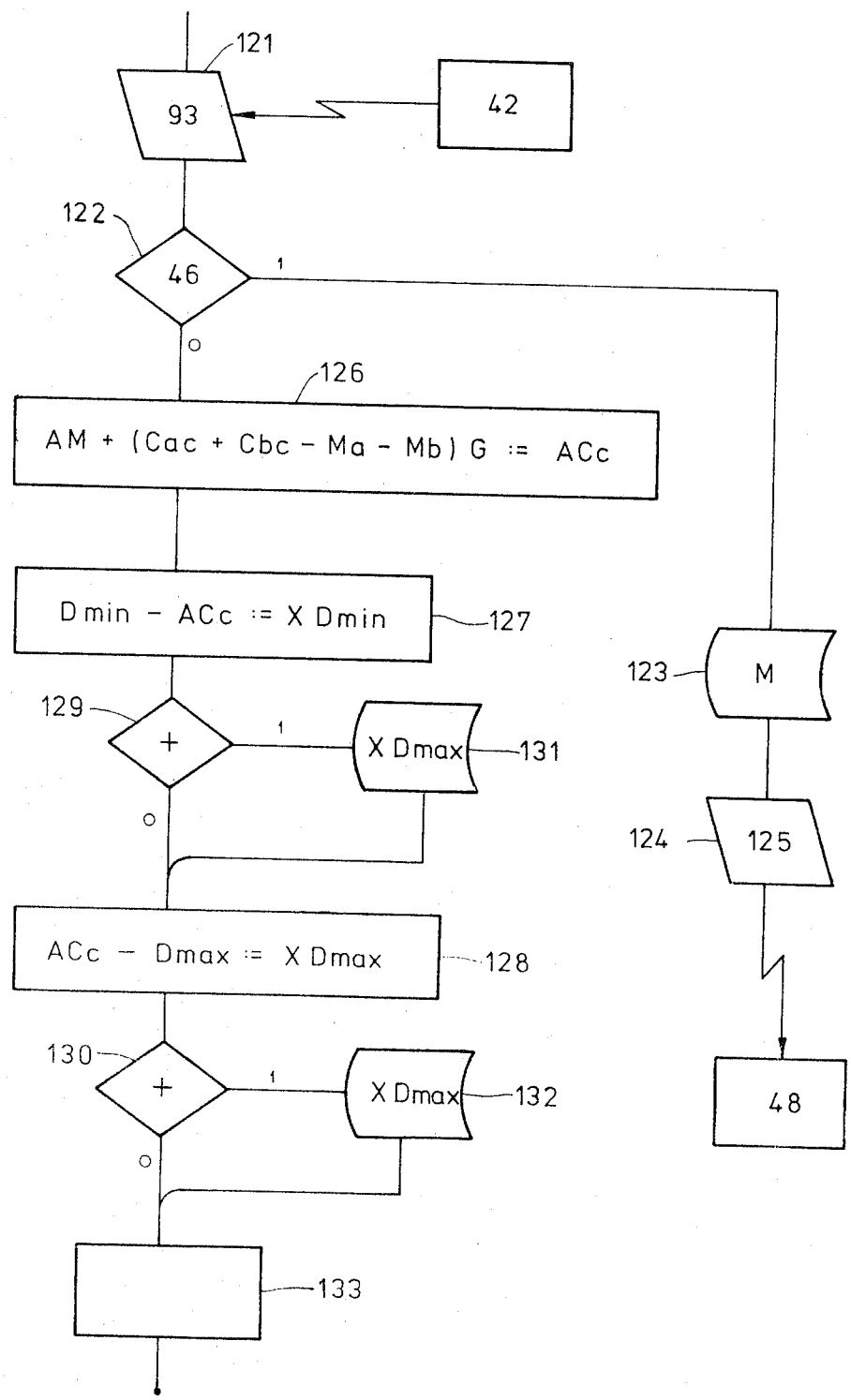
Figure 8A:
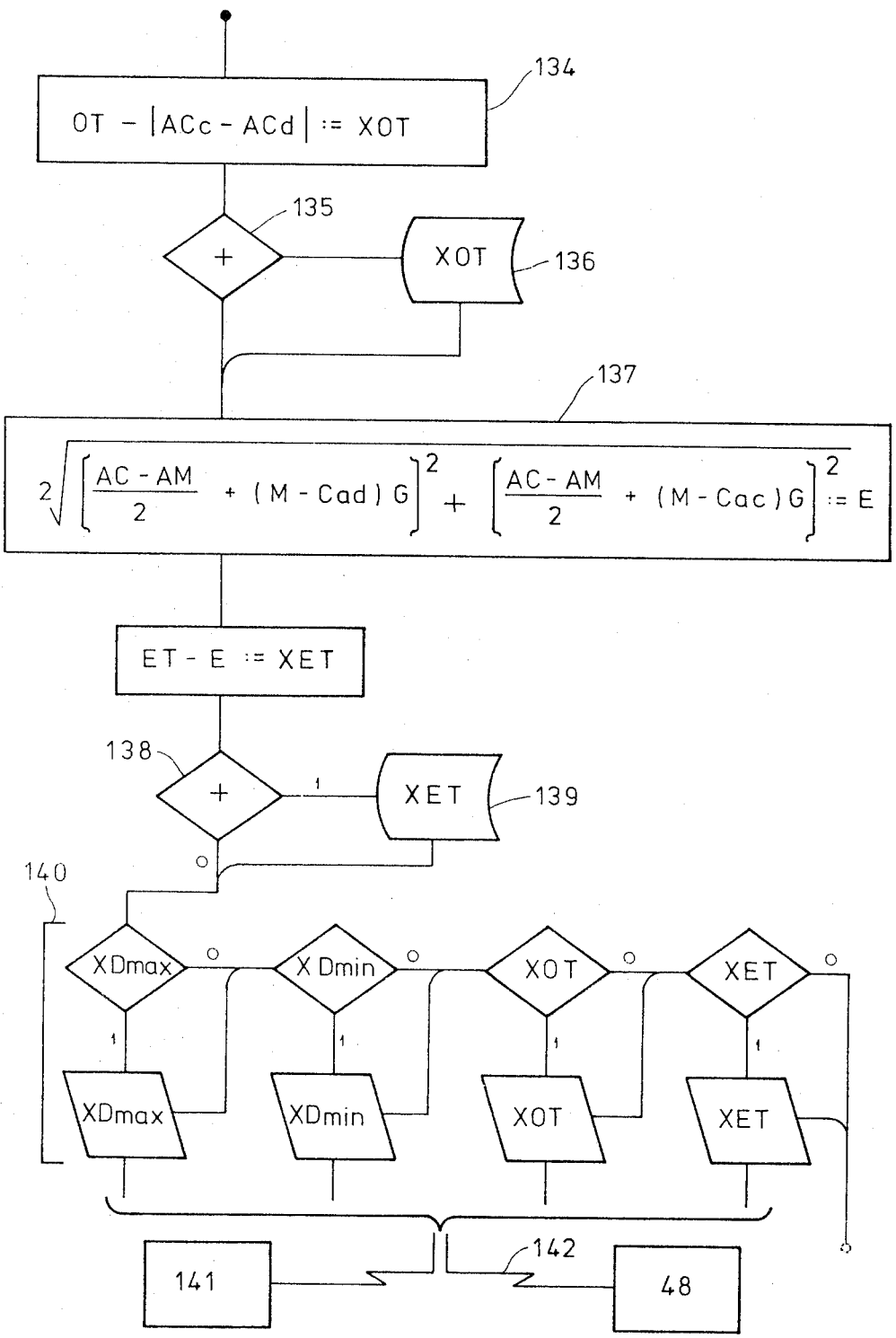
Figure 9:
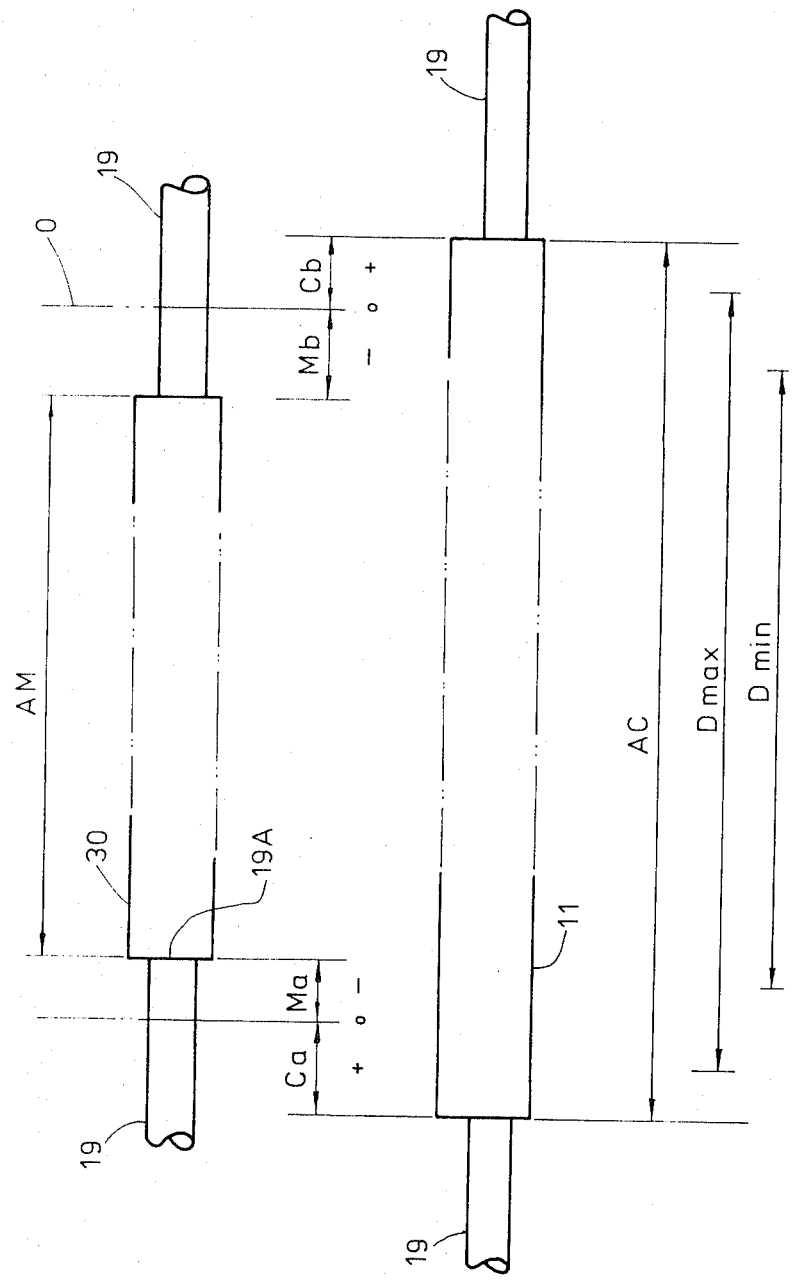

An example of apparatus and system according to this invention will now be described with reference to the accompanying drawings wherein:

FIG. 1 is a plan view of a measuring apparatus.
FIG. 2 is a side elevation of FIG. 1.
FIG. 3 is an end view of FIG. 2 as seen in the direction of an arrow III.
FIG. 4 is an end view of FIG. 2 as seen in the direction of an arrow IV.
FIG. 5 is a flow diagram of the system, the system including a display unit, a measurement processing unit, a sequencing unit and an electronic digital computer.
FIG. 6 is a logic diagram of the display unit.
FIG. 7 as continued in FIG. 7A is a logic diagram of the sequencing unit.
FIG. 8 as continued in FIG. 8A, is a flow diagram of a program for the computer.
FIGS. 9 and 10 are diagrams for explaining certain steps of the program.

Referring to the drawings, the measuring apparatus (FIGS. 1 to 4, and FIG. 7) comprises a fixture 10 for supporting a work piece or a component 11 to be measured, a support structure 12 on which the fixture 10 is mounted, and probes 13 for measuring the component.

The component is a volume of revolution having four cylindrical portions 11A, 11B, 11C and 11D to be measured. The end portions 11A, 11B, of the component rest on a pair of brackets 14 of the fixture 10, the brackets each having a horizontal edge 16 and a vertical edge 17 for locating the component. The end portions 11A, 11B, are each measured by a single probe 13. The intermediate portions 11C, 11D, i.e., portions not supported on a said bracket, are each measured by two diametrically opposite probes 13 as shown. The fixture includes a plate 15 to which the brackets are secured and which is seated on a table 21 being a part of the structure 12.

The probes 13 each comprise a body 18 supporting a rod-shaped element 19 for longitudinal sliding motion. The element 19 is positioned for a tip 19A thereof to contact the component at a point 11x thereon, a light spring 20 (FIG. 3) being provided to urge the tip into contact with the component. The element 19 is movable to either side of a zero position (to be defined later herein). Each probe body has a locating surface 25. When the element 19 is in the zero position the horizontal spacing between the surface 25 and the extremity of the tip 19A is constituted by a distance A. This distance A is the same for all probes.

In respect of each probe the fixture 10 comprises a recess 22 formed in an edge of the plate 15 and having an end surface 23 spaced horizontally from the point 11x by a distance equal to said distance A. To locate the probe in position on the fixture, the probe body is pushed into the recess 22 until the surface 25 of the body abuts the surface 23 of the fixture. The sides 26a of the recess locate the probe laterally. It will be clear that while all the probes are identical, as far as the distance A is concerned, the positions of the surfaces 23 of the recesses 22 vary with the differences between the diameters of the respective portions 11A, 11B, 11C, 11D, of the component. Therefore the fixture 10 is unique to the component, i.e., different fixtures 10 have to be provided for different components 11, but the same probes 13 may be used in combination with any one of the different fixtures. When any one fixture is manufactured the position of the surfaces 23 is measured with reference to the edges 17 which constitute datum edges for this purpose. 11D, The table 21 is a magnetic table of a kind known per se and having a handle 26 for turning the magnetism on or off. In use, when the apparatus is to be assembled for the measuring of a particular component, the fixture 10 pertaining to the component is located on the table 21 by means of lugs 27 and the probes are placed on to the table and are pushed into the recesses 22 against the surfaces 23. Thereafter the magnetism is turned on whereby both the fixture and the probes are firmly held on the table and in their required mutual relationship. Measuring of the component then involves the simple act of placing the component in position on the brackets 14.

The advantage of the arrangement described resides in the speed and convenience with which the probes and any one fixture can be assembled.

The actual measuring of the component involves determining any deviation of the probes from their zero position and comparing such deviation with a predetermined dimension tolerance. The comparison is made by a computer 120 (FIG. 5) and if the deviation is not within the tolerance, the magnitude of the out-of-tolerance is printed out by the computer. Provision is made for measuring the diameter, ovality, and eccentricity of the different portions of the component and in connection with the latter two measurements the component is connected by a pin and slot adaptor 27A to a shaft 29 which is supported on the table 21 for rotation through 90° by means of a hand lever 28 and which is withdrawable axially for release of the component.

In connection with the zero position of the probes, it will be clear that, ideally, a probe should be exactly in its zero position when the component dimension is equal to a known datum dimension. Such a condition is difficult to achieve in practice and provision is made for calibrating the probes with the aid of a master 30 which is similar to the component to be measured but differs in that it has secured thereto a collar 30A.

The computer operation involves the use of stored data specific to any one fixture and, to ensure identification of the stored data, the fixture has an identification number provided thereon in the form adapted for communication to the computer. The fixture is also provided with a coded means of identifying the number of probes employed with the fixture, this being a provision for the avoidance of errors.

Thus the apparatus has provision for five types of output information, viz, the probe positions (i.e., the positions of the sensing elements 19), the component/master identification, the angular position of the work, the fixture identification number, and the number of probes. The generation and processing of these outputs will now be described with additional reference to FIGS. 5 to 8A.

The probe position is recognized and processed by a processing unit 31 including an induction bridge 32 comprising in respect of each probe two induction coils 33, 34, surrounding the element 19 and two induction coils 35, 36, which are common to all the probes and to which the coils 33, 34 of the individual probes are connectable by a multiplexer 37. The balance of the bridge 32, as constituted by the coils 35, 36 and the coils 33, 34 of the probe selected by the multiplexer, varies as the element 19 of the probe is moved. The probe is said to be in the zero position when the bridge output, denoted 38, is zero. The alternating current of the output 38 is converted to direct current by an AC/DC converter 39 whose analog output 40 is converted into digital form by an A/D converter 40A whose output 41 is connected to a sequencing unit 42. The multiplexer 37 is cycled by a counter 43 which is stepped under the control of the unit 42 as will be described in detail later herein.

The component/master identification is effected by two switches 44, 45, mounted on the structure 12 in positions such that the switch 44 is made by the collar 29 when the master 30 is placed into position on the brackets 14. The switch 45 is made when the component 11 is placed into position. The switches 44, 45, produce signals 46, 47. connected to the unit 42 and also connected to a display unit 48 (FIGS. 5,6) there to be processed in combination with signals identifying the component/master position.

The component position is defined by two normally open switches 49, 50, mounted on the structure 12 adjacent the lever 28. When the lever 28 is in the position denoted 28/1 a lug 51 on the lever contacts the switch 49 to close it. When the lever is moved into the position denoted 28/2 the lug 51 contacts the switch 50 to close it. The positions 28/1, 28/2, are 90° apart. When closed, the switches 49, 50, produce signals 52, 53, connected to the display unit 48.

In the display unit 48 the signals 46, 47, are led through an OR gate 56 whose output is led into each of two AND gates 54, 55, which have inputs from the signals 52, 53 respectively, and which further have inputs from the "0" and "1" outputs respectively of a bistable 57 which is alternately set and reset by successive operation of a push-button switch 58. The outputs of the AND gates 54, 55, are led into an OR gate 59 whose output is connected to light a panel 60 situated adjacent the switch 58 and marked with the words "PRESS TO SCAN." The arrangement is such that when either a component or a master is present in the fixture and the lever 28 is in position 28/1 the panel 60 lights to instruct the operator to press the switch 58 thereby to establish a signal 67. As will be explained later herein, this causes the computer to read the probe outputs pertaining to position 28/1. Pressing the switch 58 also sets the bistable 57 with the result that gate 54 is disabled, the panel 60 is extinguished, and the gate 55 becomes ready to be enabled by the signal 53. The operator then turns the handle 28 to the position 28/2. This enables the gate 55 and lights the panel 60 again. The operator then presses the switch 58 to cause the probe outputs pertaining to position 28/2 to be read into the computer, and the action of pressing the switch causes the bistable to be reset again for the next reading of position 28/1 data. In this way the operator is obliged to use the positions 28/1, 28/2 alternately, the signal 67 being enabled in either case.

The fixture number and the number of probes are identified by switches 61 and 62, respectively, mounted on the structure 12 adjacent an extension 64 of the plate 15. Holes 64A in the extension 64 are arranged to constitute the fixture number and the number of probes in binary code so that when the fixture is placed on to the table 21 a corresponding selection of the switches 61, 62 is operated respectively to produce signals 65, 66, connected to the sequencing unit 42.

Referring to FIGS. 7, 7A, the sequencing unit 42 is concerned with forwarding to the computer a message comprising the following signals in the order given:
 a. the fixture under signal 65;
 b. the master/component signals 46, 47;
 c. the signals 41 being the outputs of the respective probes 13;
 d. an "end of message" signal.

The operation of the sequencing unit 42 is initiated by the signal 67 which is connected to set a bistable 70 to produce a signal 83 for enabling a group of AND gates 84 to which the signals 65, 66, 46, 47 are connected as shown. The outputs of the gates 84 are connected through OR gates 85 to a shift register 86 and the signal 83 causes the state of the gates to be read into the register 86.

The signal 83 also sets a bistable 71 connected to set a bistable 72 to initiate the next step of the sequence. The bistables 70, 71, 72 are interconnected so that the setting of the bistable 71 resets the bistable 70 and setting of the bistable 72 resets the bistable 71.

The bistable 72 produces a signal 87 connected through an OR gate 88 to set a bistable 89 to enable an AND gate 90 having as a further input a pulse signal 69 and a signal 92 from the computer whereby the latter controls the gate 90. The output, 91, from the gate 90 is connected to pulse the register 86 to discharge the contents thereof serially as a first part of a message 93 to the computer. On completion of the discharge the register produces a signal 94 connected to reset the bistable 89.

The signal 94 is also connected to set a bistable 73 connected to set a bistable 74. The bistables 72, 73, 74 are interconnected to reset each other in the same manner as described with reference to the bistables 70, 71, 72 and corresponding arrangements apply to bistables 73 to 81 to be described.

The bistable 74 produces a signal 98 led to an AND gate 99 together with the signal 94, a signal 97 indicative of the function of the converter 40 having been completed, and a signal 101 indicative of the multiplexer having made its last step, i.e., all the probe outputs 38 having been read. The input from the signal 101 is inverted so that the gate 99 is enabled, and produces an output 103, only if the signal 101 is not true. The signal 98 is also connected to an AND gate 104 together with the signal 94 and a non-inverted input from the signal 101 so as to produce an output 105 if the signal 101 is true.

The signal 103 which is true if all the bridge or probe outputs 38 have not yet been multiplexed, is connected to set the bistable 75 to set the bistable 76 to produce a signal 106 connected to enable a group of AND gates 107 to which the digits of the signal 41 are respectively connected and which have outputs to the respective OR gates 85. The signal 106 causes the signal 41 to be read into the register 86.

The signal 106 is also connected to the bistable 77 to produce an output 107A to the OR gate 88 to cause the signal 41 to be cycled serially out of the register as a further part of said signal 93. When the register is empty again the signal 94 initiates the reading of the next probe output through the bistables 73 to 77 as described.

When the last probe output 38 has been read, the signal 101 goes true thereby disabling the gate 99 and enabling the gate 104 whose output 105 is connected to the bistable 78 to produce an end of message signal 108 connected to two of the OR gates 85 to be read into the register 86.

The signal 108 is also connected through the bistables 79, 80 to produce a signal 109, connected to the OR gate 88 for the signal 108 to cycle out to the computer as the last part of the message 93 to indicate the end of the message.

The signal 94 and the signal 109 are connected through an AND gate 110 to set bistables 81, 82 to produce an output 111 for a display to the effect that the message has been read into the computer. The bistable 82 is resettable by an appropriate signal 112.

Referring now to the operation of the computer 120, the computer has a program shown in FIG. 8 by which it reads the message 93, computes the actual dimensions of the component from the signals 41, compares the computed dimensions with stored tolerances, and produces an output if any one of the dimensions is out-of-tolerance.

Information stored in the computer is identified in the program as follows:

AM = actual diameter measurement of the master in inches;
D max = the maximum of the tolerance which the component may have at a given portion and is a diameter measurement in inches;
D min = the minimum of said tolerance;
OT = the ovality tolerance in inches;
ET = eccentricity tolerance in inches; E = eccentricity;
G = a constant factor for converting the signals 41 (which represent voltages) into inch measurements.

Operating identifiers of the program are:

$i$ = any one of a serial number 1 to 4 allotted to the portions 11A to 11D of the component or master;
$a$ = one of a pair of diametrically opposite probes 13;
$b$ = the other of a pair of diametrically opposite probes 13;
$c$ = a measurement taken in position 28/1;
$d$ = a measurement taken in position 28/2.

The variables of the program are:

C = a signal 41 pertaining to a probe 13 when reading a component;
M = a signal 41 pertaining to a probe 13 when reading a master;
AC = the actual diameter of the component as calculated by the program. The order in which the identifiers $i,a,b$ are applied is such that:
C1 = signal 41 from probe 13 at portion 11A.
C2 = signal 41 from probe 13 at portion 11B.
$c3a$; $C3b$ = signals 41 from probe 13 at portion 11C.
$C4a$; $C4b$ = signals 41 from probe 13 at portion 11D.

Note: There is a corresponding notation M1 to M4 for the master but the suffices $a$, $b$ are not required for the master.

XDmax = a dimension by which the component exceeds Dmax;
XDmin = a dimension by which the component is below Dmin;
XOT = a dimension by which the component exceeds OT;
XET = a dimension by which the component exceeds ET.

Referring now to FIG. 8, the program is connected to respond to the signal 67 (produced by the operator pressing switch 58) to output the signal 92 and read out the signal 93 into the computer store as symbolized by the operation 121.

As mentioned earlier herein, the use of the apparatus involves the calibration of the probes by means of the master 30. This means that the master 30 must be placed into position into the fixture and a reading of the probes be taken for comparison with the actual dimensions AM of the master as previously measured by hand and loaded into the store of the computer.

The first action of the program after reading the signal 93 is therefore to check, by a decision 122, whether a master is present in the fixture and if so go to an operation 123 for storing the signals 41 as dimensions M and terminating with an operation 124 for outputting a signal 125 to the display unit to advise the operator that the probes have been calibrated and that a component may now be placed into the fixture for measurement. The calibration as well as subsequent operations will become apparent by reference to FIG. 9 where the element 19 is shown as contacting the master 30 but the signal 41 is taken to read zero when the tip 19A is at a line denoted 0.

When the first component has been placed into the fixture the operator presses switch 58 again and this time the decision 122 leads to operation 126 which is basically concerned with establishing the actual diameters AC in inches of the respective portions of the component. To this end operation 126 causes the dimensions $Ca$, $Cb$ to be added to the stored diameter AM of the master. Since the magnitude of C is in terms of a voltage it has to be multiplied by G to be converted into an inch dimension. This sum is then a correct derivation of the diameter of the component provided M was zero (see operation 123 above). Insofar as M was not zero $Ma$ and $Mb$ are introduced as a subtrahends in operation 126.

The actual component diameter AC is subtracted from the lower tolerance diameter Dmin in operation 127 to produce the diameter out-of-tolerance dimension XDmin. The corresponding operation to establish XDmax is carried out in operation 128. If the component is within tolerance then XDmin and XDmax are zero or negative; if they are positive then decisions 129, 130 operate to cause them to be stored by operations 131, 132.

The dimensions XDmax and XDmin are established for all identifiers $c$ and are repeated by way of a check for identifier $d$, see operation 133.

The ovality check is a matter of checking in respect of each diameter of the component whether the result of the diameter check was the same for both angular position of the component, or in other words whether $ACc = ACd$.

To this end operation 134 forms the modulus of the difference between the dimensions $ACc$ and $ACd$ and subtracts this modulus from the ovality tolerance OT to produce XOT. If XOT is positive, operation 135, the component is out of tolerance and XOT is stored by operation 136.

The eccentricity check is a matter of checking whether each of the intermediate portions 11C, 11D of the component is concentric with the end portions 11A, 11B. The expression for determining is given in operation 137 of the program. This expression can be understood with reference to FIG. 10 wherein $E$ is an eccentricity radius shown in the two positions 28/1, 28/2 of the component. The expression for $E$ in operation 137 can be shown to be derived from the following formulae:

$$(AM/2) + E \sin \theta = (AC/2) + (-Cad + M)G;$$
$$(AC/2) + E \cos \theta = (AM/2) + (Cac - M)G;$$

which will be readily understood in the light of FIG. 10. If the dimension XET is positive it is detected and stored by operations 138, 139.

Finally, the program checks whether there are any out-of-tolerance dimensions, operation 140, and if so outputs the dimensions to a typewriter 141 and outputs a fail signal 142 to the display unit 48.

What we claim is:

1. Apparatus for determining a dimension of a given surface of a component comprising a fixture for supporting the component, a probe body connected to the fixture, a sensing element supported on said probe body for movement relative thereto, the sensing element being engageable with said given surface when the component is present in the fixture, electrical means responsive to the position of the sensing element relative to said probe body for producing a first output signal, means for zeroing the output signal for a given position of said sensing element and for making the first output signal positive and negative when the element is moved to the respective sides of the given position, a master representing said component and having a given surface corresponding to said given surface of the component and being supportable on the fixture in place of the component, a computer having a data store, means contained in said store representing a dimension being the predetermined actual dimension of the master at said given surface thereof, means contained in said store representing a predetermined range of acceptable dimensions of the component at said given surface thereof, means for reading the first output signal of the electrical means into said store and thereby produce in the store means representing respectively a second output signal produced when the sensing element is engaged with said given surface of the master and a third output signal produced when the sensing element is engaged with said given surface of the component, and program means provided in the computer to produce the algebraic sum of said actual dimension of the master and said second and third output signals, said sum representing a dimension being the actual dimension of the component at said given surface thereof, said programme means including means for determining if said component dimension lies within said acceptable range.

* * * * *